United States Patent [19]

Leiker

[11] 4,312,299
[45] Jan. 26, 1982

[54] ANIMAL HOLDING CHUTE

[76] Inventor: Marvin Leiker, R.R. 2, Box 22, Victoria, Kans. 67671

[21] Appl. No.: 117,578

[22] Filed: Feb. 1, 1980

[51] Int. Cl.³ .......................... A01K 1/06; A61D 3/00
[52] U.S. Cl. ...................................................... 119/98
[58] Field of Search ..................... 119/27, 98, 99, 103, 119/147 R, 148, 151, 155

[56] References Cited

U.S. PATENT DOCUMENTS

| 502,829 | 8/1893 | Phillips | 119/27 |
| 2,787,982 | 4/1957 | Cederberg | 119/98 |
| 2,861,546 | 11/1958 | Stroup | 119/98 |
| 3,788,280 | 1/1974 | Van Gilst | 119/99 |
| 3,885,527 | 5/1975 | Maffey | 119/98 |

*Primary Examiner*—Gene Mancene
*Assistant Examiner*—Robert P. Swiatek
*Attorney, Agent, or Firm*—Richard D. Law; Dennis K. Shelton

[57] ABSTRACT

An animal chute having a scissor acting side holds the body of an animal by squeezing against an adjustable, and simultaneously squeezing the animal's neck in a slight turn, to provide an automatic head and neck size adjustment, and provides conjoint animal squeezing and head locking.

9 Claims, 8 Drawing Figures

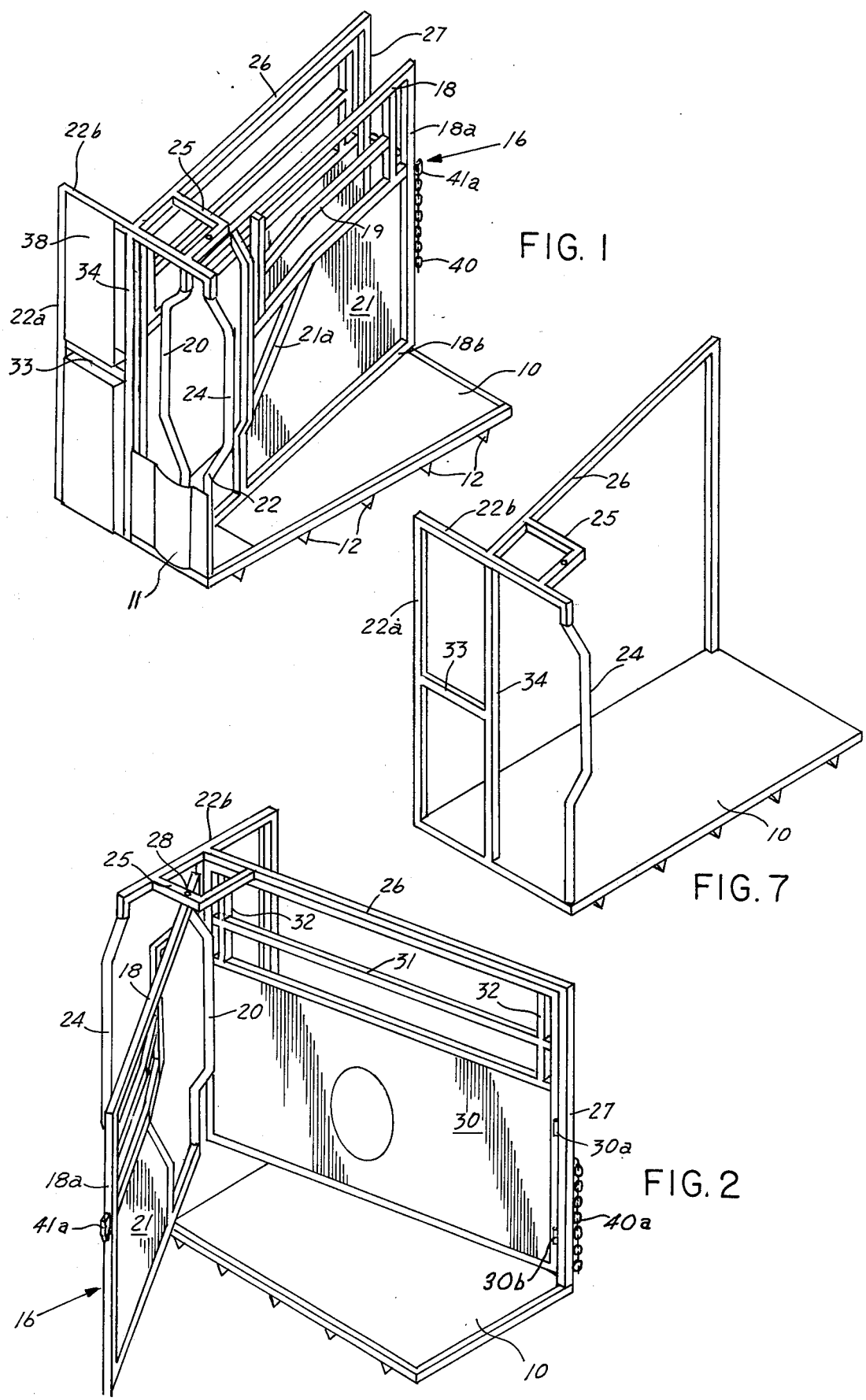

ANIMAL HOLDING CHUTE

This invention relates to an animal holding chute for a number of different kinds of animals, providing head holding as well as body holding with a scissor action tightly holding both the animal's head, at an angle, and the animal's body. The scissor action provides a tighter head hold when the body is squeezed tighter for more secure control of the animal in the chute. Opening the chute from the body releases the animal's head and a side gate may be opened so that the animal may exit from the chute through the head end.

BACKGROUND OF THE INVENTION

Animal holding chutes are necessary to secure a variety of animals, e.g. cattle, horses, sheep, pigs, etc., for treatment, tagging, inspection, etc. The usual chute uses a single moving wall, generally parallel to a stationary wall, to squeeze an animal between the two walls. A gate at the head end may be arranged to separately hold the animal's head.

Prior workers in the field arranged different units to hold different parts of the animal. For instance, Carter U.S. Pat. No. 2,234,366 of Nov. 11, 1941, used a pair of pantographs to hold an animal's head. Hill U.S. Pat. No. 2,642,840 of June 23, 1953 uses a ring to hold an animal's head. These units are not chutes per se but are gates.

U.S. Pat. No. 2,680,425 to Hagel, June 8, 1954 describes a chute with a gate for holding the animal's head, but it uses non-moving chute walls. The major object is to squeeze down on the animal's neck. The device of Maffey U.S. Pat. No. 3,885,527 of May 27, 1975, shows a British form of gates, with a double pivoted gate (a two section gate with the sections being pivoted together).

THE PRESENT INVENTION

The cute of the present invention has a combined head holding gate pivoted in a scissor action with a body holding chute, for simultaneously holding an animal's head and body. One gate opens fully for an animal exit at the head end. When closed, the chute simultaneously squeezes on the body of the animal as well as the head which is turned slightly making access to the animal's ears, neck and side face. The scissored chute wall is pivoted at the head end providing leverage for squeezing the animal and tightening on the head. The opposite wall or gate is hinged, adjusting the chute for several chest sizes of animal, and it may be opened fully for easy exit of the animal.

OBJECTS AND ADVANTAGES OF THE INVENTION

Included among the objects and advantages of the invention is to provide a scissored action chute and head hold for various sizes of animals, which simiultaneously squeezes on the animal's body as well as its head.

Another object of the invention is to provide a chute with two walls, one wall of which is scissored for squeezing on the animal's body against the other wall which is hinged for adjusting to the size of the animal.

A further object of the invention is to provide a scissored chute for firmly holding an animal by body and head, essentially eliminating injury to the animal.

Yet another object of the invention is to provide a chute for holding an animal's body and for holding the animal's head at a slight angle for easy head and neck treatments.

An additional object of the invention is to provide a chute head holding opening being pivoted to open when the chute side wall is open and closes when the side wall is closed.

These and other objects and advantages of the invention may be ascertained from the following description and appended drawings.

GENERAL DESCRIPTION OF THE DRAWINGS

FIG. 1 is a perspective view of the animal holding chute according to the invention in closed position.

FIG. 2 is a perspective view of the chute of FIG. 1 with one wall or gate in open position.

FIG. 7 is a perspective of a fixed frame work for the chute gates of the invention.

DETAILED DESCRIPTION OF THE DRAWINGS

Figure 3:
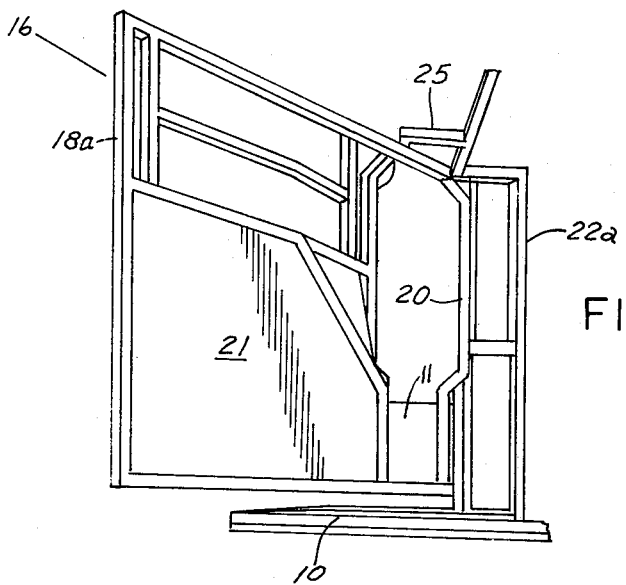
FIG. 3 is a perspective view of an open chute showing the pivoted gate and head holding unit.
Figure 4:
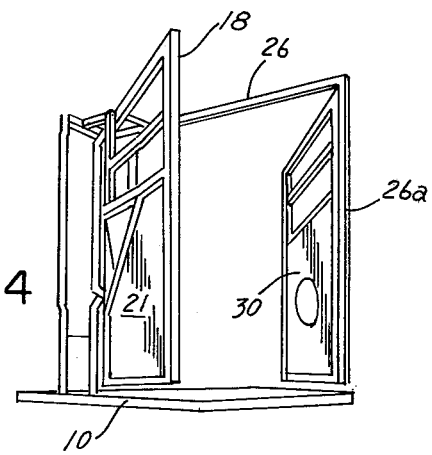
FIG. 4 is a small, perspective of the hinged gate of the chute in open position.
Figure 5:
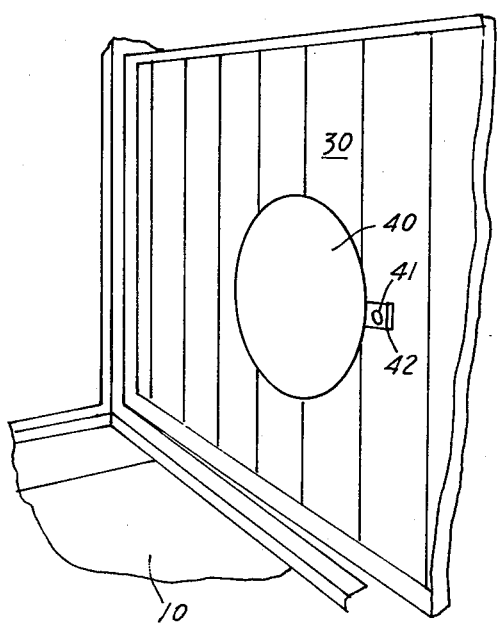
FIG. 5 is a detailed view of the hinged gate of the chute detailing an animal holding device on the wall to prevent the animal from lying down.
Figure 6:
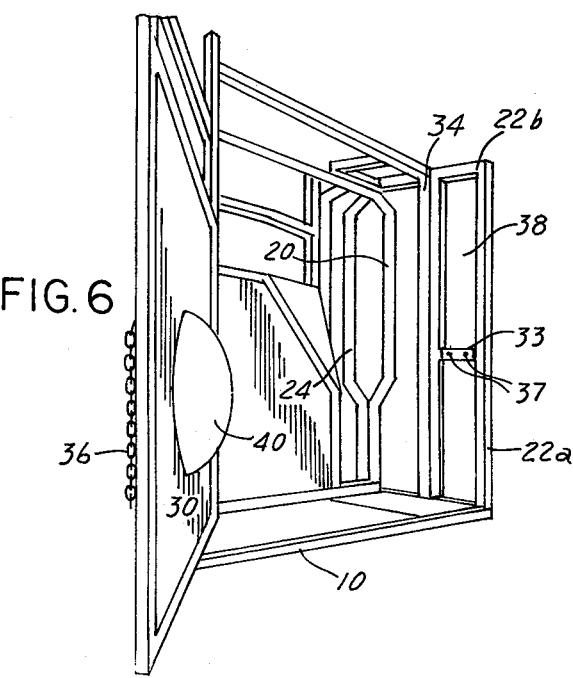
FIG. 6 is a perspective view of the pivoted gate of the chute in closed position and the hinged gate fully open.
Figure 8:
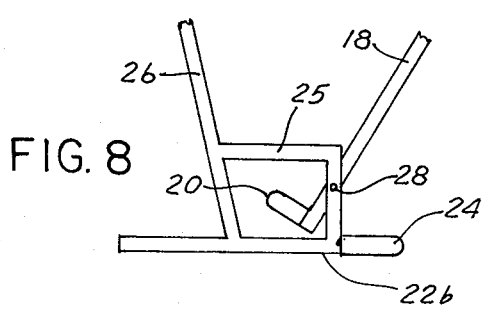
FIG. 8 is a top plan, detail of the scissor action of the pivoted gate and head holding gate.

The chute of the invention includes a solid bottom or base 10 mounted on skids or frame laterals 12. A fixed upright frame extending upwardly from the base 10 includes a straight upright 22a (a square tube) secured to top frame member 22b at a right angle. An upright 24 is secured to the base and to the opposite end of member 22b, being being to form half of the head holding gate. A top lateral member 26 is welded or otherwise secured to member 22b extending rearwardly and it is attached to rear upright 27 which is secured to the right rear corner of the base. An angle member 25 is secured to member 26 and to the front member 22b forming a rectangle therewith. A pivoted gate, shown generally by numeral 16, includes an open rectangular frame including a top member 18 secured at one end in bent portion 20 of the head holding gate. An upright frame work 22 includes the other half 24 of the head gate. The pivoted gate, also, includes rear upright member 18a and bottom member 18b secured to rear member 18a and head gate member 20. The lateral frame 25 extends from frame member 22b and at right angles connects to the top bar 26 of the fixed open frame. The gate 16 is pivoted at 28 to member 25 and to an equivalent position on the base (not shown) so that the gate may pivot around those points, opening the gate 16 as well as the head gate portion 20.

The pivoted gate 16 frame supports cross frame member 19 and a wall section 21 having a cutout portion 21a for access to a held animal. The cross member 19 is mounted on tubes at each end permitting it to be lifted for access to a held animal.

The hinged gate is hinged by hinges 30a and 30b, FIG. 2, on an upright 27 of the fixed frame, and it includes a gate 30 with a cross bar 31, which may be raised, mounted on an upper frame portion 32 of the gate, secured to the top cross piece of the gate 30. The gate 30 is releasably secured to cross bar 33 mounted on front frame 22a and upright 34. This changes the distance of the gates in closed position. The hinged gate is releasably held on the frame in a predetermined fixed position, at a different angle so as to adjust the chute for the size of the animal's chest. A chain 36 secured to the front of the gate 30 is arranged for temporary connection to chain holders 37 on the cross member 33. A sheet metal blank 38 closes the opening between the frame side of frame 22a and upright 34. For certain animals, a bulbous holder 40 may be mounted on gate 30, as by bolts 41 through straps 42 into the gate. This member prevents animals from lying down by pressing in their sides.

The members 20 and 24 are preferably made of round stock so as to prevent injury of the held animals. The remaining members may be made of square tubing or boxed channels or angles. The gates may include wooden members filling in the frame work for holding the animal's sides.

For use, the hinged gate is closed and is held in predetermined position by a latch between the end of gate 30 and cross bar 33. The pivoted gate is swung open which, also, opens the head gate comprising members 20 and 24. When the animal is driven into position, the pivoted gate is pivoted against the animal, squeezing it against the other gate. The head of the animal is in position between members 20 and 24, so that the neck is similtaneously squeezed. The members are positioned so as to turn the head slightly in the squeezing process. After the animal has been treated, the pivoted gate is released to release the head, and the hinged gate is opened so the animal may exit from the head end of the chute. To half hold the chute shut, a chain latch 40a secures the rear ends of the gates adjustably closed. The chain is preferably secured to the frame of the hinged gate, and a chain link catch 41a secured to the frame of the pivoted gate provides easy and quick holding and release. The hinged gate is readily held in predetermined position by a pin (not shown) in one of the holes 37 in the bar 33. The hinged gate is positioned so as to provide a sufficient squeeze on the body of the animal and at the same time squeezes the animal's neck to hold the head at a slight angle. Thus different sizes of animals may be equally held by their bodies and conjointly with their heads. The adjustment provides means so there is no undue squeezing on the body or the head of the animal. Of course, guide fences are used for guiding animals into the chute. The animals entering the chute are prevented from exiting through the neck holding bars 20 and 24 by a barrier 11, FIG. 1, secured to the deck 10 and the adjacent uprights at the opening between members 20 and 24. The barrier may effectively be a punched and expanded metal sheet, or may be solid sheet, as desired. The barrier is sufficiently high so that along with members 20 and 24, the animal is discouraged from exiting from the gate over the barrier. On opening gate side 30, the animal may exit head first by pulling head out of the opening and passing out the side without passing over the barrier 11. This barrier is effective for different types and sizes of animals to be held in the chute.

While the invention has been described by reference to specific details equivalent members may be substituted for the various parts, and these are intended to be covered by the following claims.

What is claimed is:

1. An animal holding chute for simultaneously holding an animal's body and head comprising:
   (a) planar base means for supporting a standing animal,
   (b) upright frame means inclusive of an open front frame depending upwardly from said base means and having a stationary portion thereof formed into a half of a head holding gate, and a rearwardly extending, open hinged gate frame depending from said open front frame and secured to an upright at the rear of said base means, and a pivot holding frame member extending from said open front frame to said hinged gate frame,
   (c) a first gate hinged to said rear upright and angularly, adjustably held on said front frame,
   (d) a second gate secured by a pivotal attachment adjacent to and spaced from its front end on said pivot holding frame member and on said base, the front portion of said second gate formed into a moving portion of the other half of said head holding gate and the rear portion formed as a body holding gate against said hinged gate, said pivot attachment arranged to provide scissor action for conjoint closing and opening of both said head and body gates and
   (e) adjustable holding means for temporarily securing said second gate.

2. An animal holding chute according to claim 1, wherein said hinged gate is hinged to swing open away from said pivoted gate for release of an animal from the chute.

3. An animal holding chute according to claim 1, wherein said pivoted gate is adjustably and temporarily held closed for holding different sizes of animals.

4. An animal holding chute according to claim 3, wherein the holding means is a chain secured by one end on said rear upright and a link holder for the chain is mounted on said pivoted gate.

5. An animal holding chute according to claim 1, wherein said stationary half and said moving half of said head holding gate include a generally vertical bar having a central portion bent outwardly in cooperating positions to form a neck holding gate portion.

6. An animal holding chute according to claim 5, wherein said stationary one half portion of the head holding gate is staggered forwardly of the other half to slightly bend the head and neck of a held animal.

7. An animal holding chute according to claim 1, wherein each said hinged and pivoted gate includes generally solid portions for holding an animal's body, and raisable top bars for access to the animal.

8. An animal holding chute according to claim 1, wherein said hinged gate includes a bulbous member mounted on said hinged gate in position to press into the side of a held animal.

9. An animal holding chute according to claim 1, wherein said pivot holding frame member is a right angle frame portion including a bar normal to said open front frame providing means for supporting the upper pivot of said pivoted gate.

* * * * *